United States Patent [19]

Lee et al.

[11] 3,959,653

[45] May 25, 1976

[54] FAST CHARGE DIGITIZER AND DIGITAL DATA ACQUISITION SYSTEM FOR MEASURING TIME VARYING RADIATION FIELDS

[75] Inventors: Thomas R. Lee, Gaitherburg, Md.; Roger H. Schneider, Washington, D.C.; John L. Wyatt, Berkeley, Calif.

[73] Assignee: The United States of America as represented by the Secretary of the Department of Health, Education and Welfare, Washington, D.C.

[22] Filed: Apr. 14, 1975

[21] Appl. No.: 567,719

[52] U.S. Cl................................. 250/374; 250/336; 250/375
[51] Int. Cl.² ........................ G01T 1/16; G01T 1/18
[58] Field of Search ........... 250/336, 374, 375, 376, 250/387, 388

[56] References Cited
UNITED STATES PATENTS

| | | | |
|---|---|---|---|
| 3,875,410 | 4/1975 | Luger................................ | 250/374 |
| 3,878,496 | 4/1975 | Erickson.......................... | 250/374 X |
| 3,897,344 | 7/1975 | Marshall et al................. | 250/387 X |

*Primary Examiner*—Archie R. Borchelt
*Attorney, Agent, or Firm*—Browdy and Neimark

[57] ABSTRACT

A radiation measuring instrument including a fast charge digitizer and a digital data acquisition system has been developed. The fast charge digitizer includes a charge integrator connected to a conventional ionization chamber which generates an output current in proportion to ionizing radiation exposure rate. The charge integrator has an output connected to a comparator which is switched from a high state to a low state when the output of the integrator goes above the comparator threshold. The comparator output is connected to a bistable multivibrator consisting of two non-retriggerable one shot multivibrators connected in a feedback configuration. As long as the comparator output is in the low state, the bistable multivibrator generates a train of pluses which are fed back through an analog switch and a high megohm resistance to the input of the integrator. This feedback is negative and has the effect of removing the charge from the integrating capacitor, thus causing the integrator output eventually to drop below the comparator threshold. When this occurs the comparator output returns to the high state and the bistable multivibrator ceases to generate output pulses. An output terminal is connected between the bistable multivibrator and the analog switch and feeds a train of pulses proportional to the amount of charge generated by the multivibrator output voltage and the high megohm resistance to a counter connected to a random access memory device. The output pulses are counted for a predetermined time and then stored in one of the data locations of the random access memory device. The counter is then reset and a further predetermined sample period is counted. This continues until all of the locations in the random access memory device are filled and then the data is read from the random access memory device.

10 Claims, 4 Drawing Figures

3,959,653

FAST CHARGE DIGITIZER AND DIGITAL DATA ACQUISITION SYSTEM FOR MEASURING TIME VARYING RADIATION FIELDS

FIELD OF THE INVENTION

The present invention relates to a radiation measuring instrument incorporating a fast charge digitizer and a digital data acquisition system for the measurement of time varying radiation fields. The instrument is intended for use in the enforcement of 21 CFR 278.213, "Performance Standards for Electronic Products: Diagnostic X-ray systems and their Major Components", as promulgated under P.L. 90–602, "The Radiation Control for Health and Safety Act of 1968".

BACKGROUND

In conventional radiation measurement devices using an ionization chamber, the measurement of the electrical charge output of ionization chamber can be accomplished in several general ways. One conventional technique employs an operational amplifier connected as an integrator. A voltage is built up across the feed back capacitor of the operational amplifier, amplified and displayed using a conventional volt meter. This technique involves strictly analog circuits and therefore has the inherent drawbacks of non-linearity, limited input dynamic range, and slow response which are associated with these types of circuits. Regardless of the type of readout, this is an analog conversion technique.

A second conversion technique, introduced in 1957 by Helmer and Hemmendinger, "Precision Integrator for Beam Current" Rev. Sci. Instr. 28(8):649-651, August 1957, uses a closed loop feedback system whose input is the charge to be measured and whose output is a train of logic pulses. The system shown in FIG. 1 is best described as a negative feedback loop acting to ensure that the average charge into the integrator is zero.

This type of circuit functions when a negative charge output from an ionization chamber is applied to the integrator which causes the output of the integrator to rise until the comparator switches state. This switching gates on the multivibrator causing the generation of a train of outputs pulses, each of which turns on a charge impulse source for a predetermined length of time. The output of the charge impulse source consists of a series of uniform packets of positive charge. These charge packets decrease the net negative charge stored in the integrating capacitor, causing the integrator output voltage to fall. If after the first charge impulse source pulse the output of the integrator has fallen below the comparator's switching threshold, the comparator returns to its original state, thereby inhibiting further pulse generation by the multivabrator.

If the input charge from the ionization chamber is sufficiently large to prevent a single feedback pulse from switching the comparator, the multivibrator is allowed to continue generating pulses until the accumulated input charge is nulled. The number of pulses required to null the charge stored in the integrator is proportional to the amount of input charge from the ionization chamber.

In the original circuit described by Helmer and Hemmendinger, a small dump capacitor and a reversing switch comprised the charge impulse source. The reversing switch consisted of four reed switches connected in a bridge configuration. This switch limited the operating speed of the circuitry to approximately 200 Hz. The reversing switch was used to connect the dump capacitor across the integrating capacitor, thereby causing the transfer of a known quantity of charge to the integrating capacitor. Using this circuit, a digital representation of currents as low as $10^{-7}$ amperes was attainable. The circuit was linear over two decades of input current, with the calibration factor between input pulse rate and input current dependent only on the absolute value of the dump capacitor and the value of the voltage to which the dump capacitor was charged prior to the switching.

Since 1957, several variations of the original circuit have been described. Improvements to the circuit have been made in two areas; improved electrometer design and improved charge impulse source design. Most common among the proposed changes has been the replacement of the charge impulse source with a shorting switch across the integration capacitor. This approach has some major drawbacks. First, there exists an input dead time, while the capacitor is being shorted, and any input current falling during this dead time is lost resulting in nonlinearities at high input charge rates. The second disadvantage is that the threshold level of the shorting circuit affects the calibration factor of the instrument.

A significant improvement to the original circuit has been described by Pelah and Mayden "High Accuracy Low Current Digital Integrator" IRE Trans. Nucl. Sci. NS-9(5):27–31, November 1962, who introduced the concept of using a diode pump. In this technique the integrating capacitor is partially discharged by means of a constant current through a forward biased low leakage diode. With this solid state charge impulse source, Pelah and Mayden were able to increase the multivibrator frequency to 30 kHz. This resulted in a circuit which was linear over five decades while measuring currents as low as $10^{-9}$ amperes.

The circuits of prior art have several shortcomings which must be corrected. The first is the relatively long response time. This results in inaccuracy of time measurement especially for short exposures. The second shortcoming of the circuits of the prior art consists of not being able to measure currents below $5 \times 10^{-13}$ amperes while still remaining linear over more than two decades of input range without range switching.

In addition in the field of X-ray exposure measurement there is a great need for a device capable of displaying the actual variation in X-ray exposure rate. The size and weight of the apparatus are desirably kept as low as possible in order to facilitate field use by personal measuring data output characteristics of a large number of widely scattered X-ray machines in order to ensure compliance with Federal Statutory Provisions.

Since the unit of X-ray exposure (the Roentgen) is defined in terms of ionization in air, there is also a need for a compact lightweight and simple apparatus employing an air equivalent radiation detector. Finally, for simplicity of measurement and facility of use of the present invention it would be desirable to have a device capable of giving digital readout of the radiation exposure during any sampling. (variable between 100 microseconds and 1 second) or any combination of sampling periods.

OBJECTS OF THE INVENTION

It is therefore an object of the present invention to provide for improved measurement of radiation.

It is another object to create a radiation measuring instrument, incorporating a fast charge digitizer, for use in obtaining and displaying digital representations of time varying X-ray fields.

It is a further object of the present invention to provide a radiation measuring instrument for use in obtaining and displaying digital representations of time varying X-ray fields which has a response time of less than one millisecond.

It is an additional object of the present invention to provide a radiation measuring instrument for use in obtaining and displaying digital representations of time varying X-ray fields which is linear over greater than 3 decades in the input range without range switching.

It is another object of the present invention to provide a radiation measuring instrument for use in obtaining and displaying digital representations of time varying X-ray fields which has an output display showing the actual time variations in the X-ray exposure rate.

It is still another object of the present invention to provide a radiation measuring instrument for use in obtaining and displaying digital representations of time varying X-ray fields which has a size and weight suitable for field use.

It is still a further object of the present invention to provide a radiation measuring instrument for use in obtaining and displaying digital representations of time varying X-ray fields which uses an air equivalent radiation detector.

It is yet another object of the present invention to provide a radiation measuring instrument for use in obtaining and displaying digital representations of time varying X-ray fields capable of giving a digital readout of the radiation exposure during any sampling (time variable from 100 microseconds to 1 second) or any combination of sampling.

The above objects and other objects which will be apparent from the specification are accomplished by providing an instrument which consists of a conventional ionization chamber for the detection of ionizing radiation such as X-ray radiation, and an electronic circuit which generates pulses of charge representative of the detected ionization from the radiation. The output of the ionization chamber is connected to a charge digitizer constructed in accordance with the present invention. The charge digitizer is an improvement over charge to pulse conversion circuits of the prior art in that it, for example, has an improved response time of less than 1 millisecond, is capable of measuring currents as small as $10^{-14}$ amperes, and provides an output of digital pulses with a linear proportion to the charge generated by the ionization chamber over a three decade input range without range switching.

These pulses, which consitute a digital representation of the radiation exposure, are accumulated in a counter in the sampling and the storage unit for a fixed period of time (sampling period). At the end of a samping period, the contents of the counter are stored in a memory location and the counter is reset. Immediately thereafter, another sampling period is begun and the sampling and storage processes repeated with the sample value stored in the next memory location. This process continues until all memory locations have been written. After the sampling process is completed, the display process begins.

The contents of the memory locations are sequentially input into a visual display unit which consists of a digital-to-analog converter which drives the vertical deflection plates of a CRT. The horizontal deflection for the visual display unit is provided by the memory address register of the sampling and storage unit through a second digital-to-analog converter. In this way, a time history of radiation exposure is obtained, stored, and displayed. The charge digitizer of the present system represents a significant improvement over other previously described buffer techniques for very small charges and currents.

BRIEF DESCRIPTION OF THE DRAWINGS

The present invention can be more fully understood by reference to the detailed description of the preferred embodiments with reference to the drawing, wherein.

DETAILED DESCRIPTION OF THE PREFERRED EMBODIMENTS

Figure 2:
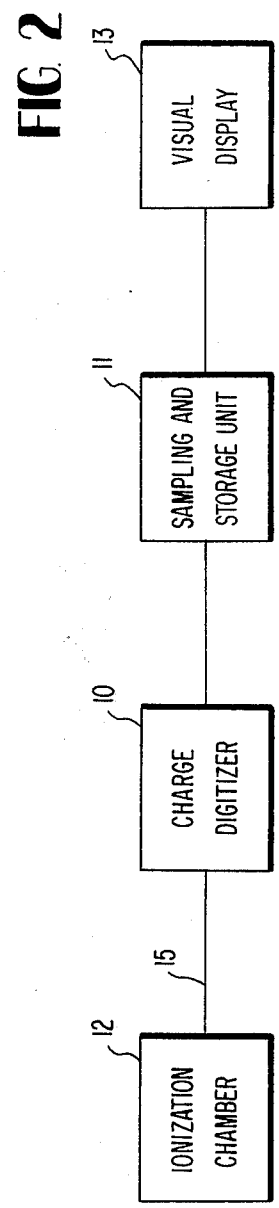
FIG. 2 is a sample block diagram of the radiation measuring device of the present invention.

Referring first to FIG. 2, which shows a simple block diagram of an embodiment of the system of the present invention, the instrument of the present invention consists of an ionization chamber 12 which converts radiation exposure to electrical charge. This charge is conducted to a charge digitizer 10 by means of a low noise triaxial cable 15. The charge digitizer 10 then generates a train of logic pulses, the total number of which is proportional to the amount of charge received from the ionization chamber 12. These pulses, which consitute the digital representation of the radiation exposure, are accumulated for a fixed period of time (a sampling period) in a counter in a sampling and storage unti 11, as discussed further below, which is connected to the charge digitizer 10. At the end of the sampling period, the contents of the counter are stored in a memory location also within the sampling and storage unit 11, and the counter is reset.

Immediately thereafter, another sampling period is begun and the sampling and storage process is repeated with the sample value being stored in the next memory location. This process continues until all memory locations have been "written". After the sampling process is completed, the display process is begun. The contents of the memory locations are sequentially input into the visual display unit 13 which provides a visual display of the history of the radiation exposure, as more fully described hereinbelow.

The ionization chamber 12 of the present invention may consist of a Victoreen Model 666 diagnostic chamber. The chamber is constructed of a black, paper base, phenolic with a wall thickness of 220 mg/cm². The volume of the chamber is 2.37 cm³ and the outside diameter is 3.17 cm. The inside walls of the chamber are coated with a conductive layer of aquadag and are electrically connected to the outside shell of the triax connector. The shell is biased at −30 volts with respect to system ground by a voltage supply and a battery 17 shown in FIG. 3.

The center electrode of the ionization chamber 12 collects the negative charge created by the ionizing radiation. At 30 volt bias voltage, the chamber has a collection efficiency of greater tha 95% at exposure rates of up to 30,000 R/hr. The response of chamber 12 is uniform within approximately + 20% over a photon energy range from 20 keV to 1.2 MeV. The average ion transit time between creation and collection is less than 1 millisecond and is the limiting factor in the overall system response time. The chamber 12 has a charge output of $7.2 \times 10^{-13}$ coulombs per mR. Connection to the charge digitizer 10 is made by means of a 20-inch long Keithley low-noise triaxial cable 15.

Figure 3:
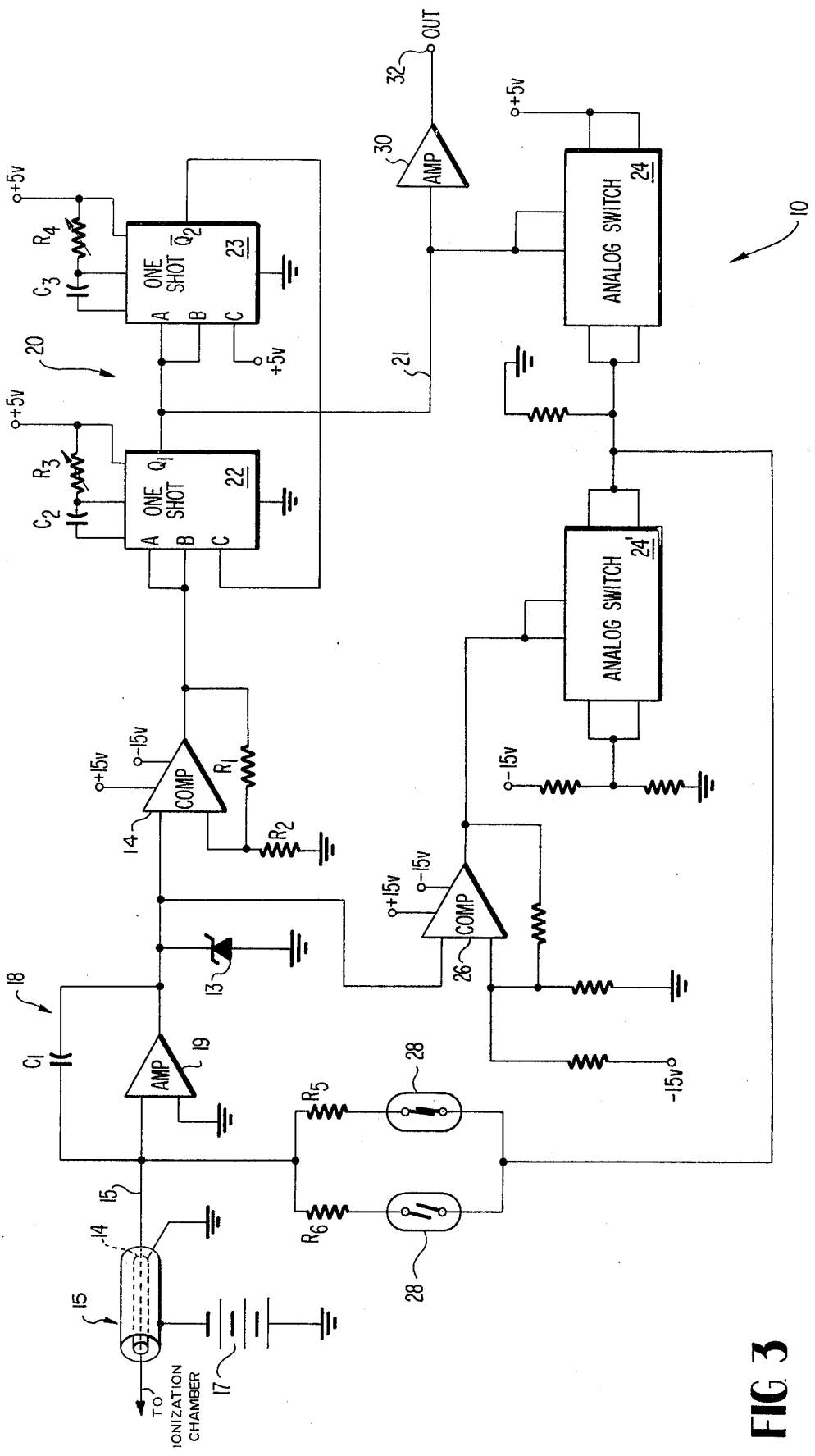
FIG. 3 is a schematic diagram of the charge digitizer of the present invention which is connected to a conventional ionization chamber.

The charge digitizer 10 shown more fully in FIG. 3, is used to convert the charge from the ionization chamber to logic pulses. The charge digitizer 10 used in the present invention represents a significant improvement over previously described buffer techniques for very small charges and currents.

Figure 1:
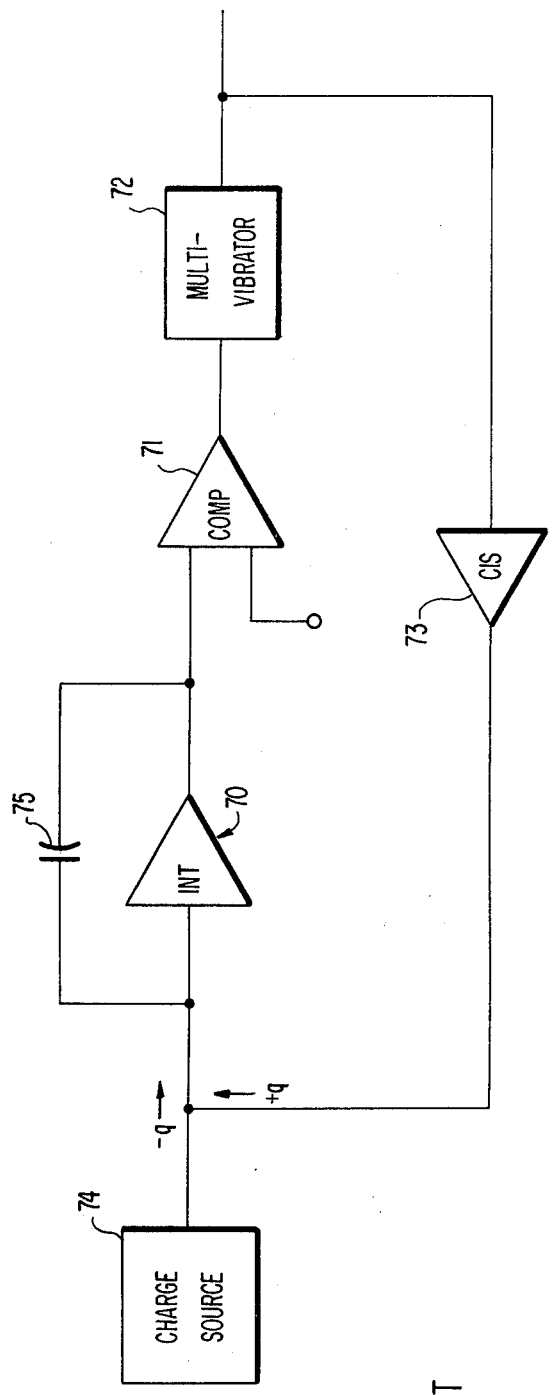
FIG. 1 is a schematic diagram of a charge digitizer of the prior art.

The charge digitizer of the present invention is basically an improvement over the circuit described by Helmer and Hemmendinger, supra, which used a closed loop feedback system to convert an input of charge to be measured to an output of a train of logic pulses. FIG. 1 shows the basic circuit described by Helmer and Hemmendinger which consists of an integrator 70 with an output connected to a comparator 71 whose output triggers a multivibrator 72 which generates a train of output pulses each of which turns on the charge impulse source 73 for a predetermined length of time. The output of the charge impulse source consists of a series of uniform packets of positive charge. These charge packets decrease the net negative charge stored in the integrating capacitor 74 causing the output voltage of the charge source 74 supplying the negative charge to the integrator to decrease.

In the original circuit described by Helmer and Hemmendinger, a small dump capacitor and a reversing switch comprised the charge impulse source 73. The reversing switch consisted of four reed switches connected in a bridge configuration. This switch limited the operation speed of the circuit to approximately 200 Hz. The reversing switch was used to connect the dump capacitor across the integrating capacitor, thereby causing the transfer of a known quantity of charge on the intergrating capacitor. Using this circuit, a digital representation of currents as low as $10^{-7}$ amperes was attainable. The circuit was linear over two decades of input current, with the calibration factor being dependent only on the absolute value of the dump capacitor and the value of the voltage to which the dump capacitor was charged prior to the switching.

Since 1957, several variations of the original circuit have been described with improvements relating to electrometer design and improved charge impulse source design. The present invention relates to a further improvement of the basic circuit which uses a conventional state of the art electrometer 12 and an improved charge impulse source in order to measure currents below $10^{-14}$ amperes.

As shown in FIG. 3 the ionization chamber 12 is connected through triaxial cable 15 to integrator 18 which consists of an operational amplifier 19, which may be a PAR Model 137. This amplifier 19 has a maximum offset current of $5 \times 10^{-15}$ amperes with an input resistance of greater than $10^{12}$ ohms. It has a minimum slew rate of 1.2 volts per microsecond and a full power frequency response to 15 kHz. A feedback capacitor, $C_1$, connected across the operational amplifier 19 may be a 0.5 pf sealed glass unit chosen for high leakage resistence. The accuracy and stability of $C_1$ do not affect the accuracy of the instrument. The value of $C_1$ is merely a conversion factor between the charge at the input and the voltage at the output of the integrator 18. Regardless of the value of the conversion factor, the circuit will act to deplete the charge on $C_1$ with a series of uniform charge feedback pulses. The total number of these pulses is an accurate digital representation of the quantity of input charge, independent of the value of $C_1$.

The comparator 14 shown in FIG. 3 is connected to the output terminal of integrator 18 and may be a MONO CMP-01. This comparator 15 has a maximum input offset voltage of 0.8 mV and a response time of less than 150 $\eta$ sec. Resistors $R_1$ and $R_2$ provide positive feedback which prevent the circuit from oscillating under conditions of slowly rising integrator output (small input currents). When the output voltage of the integrator 18 is more positive than the threshold of the comparator 14, the comparator 14 output voltage is at a low state.

A multivibrator 20 is connected to the output terminal of the comparator 14. The multivibrator 20 consists of a pair of non-retriggerable one-shot multivibrators 22, 23 connected in a feedback configuration. The first one-shot 22 is gated by the output of the comparator 14.

Operation of the multivibrator 20 is as follows. In the untriggered state the $Q_1$ is low and $\overline{Q}_2$ is high. When the input voltage to the comparator 14 from integrator 18 exceeds the comparator 14 switching threshold the output of comparator 14 switches from a high state to a low state. This transition, coupled with the high level voltage at C from $\overline{Q}_2$ of one-shot 23, causes the first one-shot 22 to fire, thereby causing $Q_1$ to remain at a high level for a fixed period of time determined by capacitor $C_2$ and variable resistor $R_3$. At the end of this fixed period of time, $Q_1$ returns to a low state, thereby firing the second one-shot 23. $\overline{Q}_2$ then goes to a low state for a fixed period of time determined by capacitor $C_3$ and resistor $R_4$. After this fixed period of time, $\overline{Q}_2$ returns to its high state.

Since the $\overline{Q}2$ is fed back to the input C of the first one-shot 22, it is capable of causing one-shot 22 to fire once again. This firing of one shot 22, however, is conditioned on the other input A, B to one-shot 22 being low, i.e., the comparator output voltage being low.

As long as the comparator output remains at a low state, the multivibrator 20 continues to run until such time as the comparator output voltage returns to its high state, i.e., sufficient charge is drained off the integrating capacitor $C_1$ to cause the integrator output to fall below the comparator 14 threshold. The principal advantage of this scheme is that once one-shot 22 has been triggered, the comparator 14 output cannot truncate the multivibrator output pulse. Because of this, all output pulses are of the same width. In addition, when a single pulse is not sufficient to bring the output of integrator 18 below the threshold of comparator 14, the digitizer does not cease to function as is the case of some current to frequency converters of the prior art.

The output pulses from the first one-shot 22 are used to dump positive charge on the integrating capacitor $C_1$. This is sccomplished by means of AH0014 analog switch 24 and a glass, high megohm, resistor $R_5$ or $R_6$. Analog switch 24 and high megohm resistor $R_5$, $R_6$ are connected in series with each other between the output $Q_1$ of one-shot 22 and the input of integrator 18. Because of the low leakage through the high megohm resistor $R_5$, $R_6$ this charge impulse source represents a significant improvement over previously described charge impulse sources, such as discussed in relation to the prior art circuit shown in FIG. 1, especially at input currents below $10^{-13}$ amperes. The output of one-shot 22 which appears on output terminal 21 controls the analog switch 24. The analog switch 24 is closed when the output signal from oneshot 22 is high. In this state, +5 volts is applied to the input of the integrator 18 through high megohm resistor $R_5$ or $R_6$. The amount of charge dumped onto the capacitor $C_1$ of integrator 18 depends on the width of the output pulse from one-shot 22, the value of the high megohm resistor $R_5$, $R_6$, and the value of the voltage across the high megohm resistor $R_5$, $R_6$. With the analog switch 24 open, the voltage across the high megohm resistor $R_5$, $R_6$ is less than 10 uV, resulting in less than $10^{-16}$ ampere input leakage current.

For each instrument, the output voltage across the high megohm resistor $R_5$, $R_6$ with the analog switch 24 open and the resulting leakage, are fixed and the output pulse width of one-shot 22 is thus adjusted to provide proper calibration.

Two sensitivity ranges can be established by the use of two different high megohm resistors connected in parallel and switched by means of reed switches 28 connected in series with each of the high megohm resistors $R_5$, $R_6$. Reed switches 28 have a typical off resistance of $10^{15}$ ohms. One of the high megohm resistors $R_5$ may be a resistance with a value of $10^{11}$ ohms, while the other high megohm resistor $R_6$ may be a resistor having a value of $10^8$ ohms. The high megohm resistor $R_5$ defines the more sensitive range of the present charge digitizer while the high megohm resistor $R_6$ defines the less sensitive range. Only one of the high megohm resistors $R_5$ or $R_6$ is preferably connected between the analog switch 29 and integrator 18. To calibrate the device of the present invention $R_3$ is adjusted to yield an output pulse of approximately $1.2 \times 10^{-16}$ coulombs on the more sensitive range. This adjustment results in an instrument overall calibration factor of 6,000 output pulses per mR of radiation exposure to the ionization chamber. On the insensitive range the calibration factor is then 6,000 pulses per R.

In order to prevent a positive input charge excursion (from noise or other spurious signals) from saturating the integrator 18 in the negative direction, an additional comparator 26 and analog switch 24' have been added to the charge digitizer 10. Comparator 26 and analog switch 24' are connected in series with each other between the input terminal of comparator 14, to which comparator 26 is connected, and the input terminal of integrator 18. The comparator 26 senses a negative excusion of the integrator 18 output and controls the analog switch 24' which connects the input of integrator 18 to a −5 volt negative source, through either $R_5$ or $R_6$.

The charge digitizer 10 of the present invention is a true charge digitizer as opposed to current digitizers or integrators presently in use, in that charge impulses whose instantaneous charge rates exceed the upper limit of the dynamic range for current can be stored by the device and accurately digitized. For these charge rates the multivibrator 20 runs continuously. Because the total feedback current with the multivibrator 20 free running is not sufficient to null the input current to the integrator 18, the output of the integrator continues to increase as long as the input signal is applied to the integrator 18. During this time, the multivibrator 20 is continuously gated on. When the input signal to the integrator 18 terminates, the multivibrator 20 continues to run until the integrator 18 output is brought below the comparator 15 threshold. The total number of output pulses from one-shot 22 is thus proportional to the total input charge. The output of the integrator 18 is allowed to rise to approximately 7 volts before zener diode 13 limits the output in order to protect the comparator 14. On the more sensitive scale, a charge impulse of $3.5 \times 10^{-12}$ coulombs can be measured without limiting the output of the integrator 18.

In operation, the charge digitizer 10 has two input ranges depending upon which high megohm resistor $R_5$ or $R_6$ is selected. On the more sensitive range, radiation measurements are made over a range of 1 mR/minute to 1 R/minute with a signal to noise ratio at the low value of better than 3 to 1. On the less sensitive range, the device is linear from 1 R/minute to 1000 R/minute. With the charge digitizer on the more sensitive range, the instrument is capable of measuring one second exposures of 100 uR with a signal to noise ratio of greater than 10. The response time of the charge digitizer is less than 100 u sec. The output of one-shot 22 is also applied through amplifier 30 to the output terminal 32 of the charge digitizer.

Figure 4:
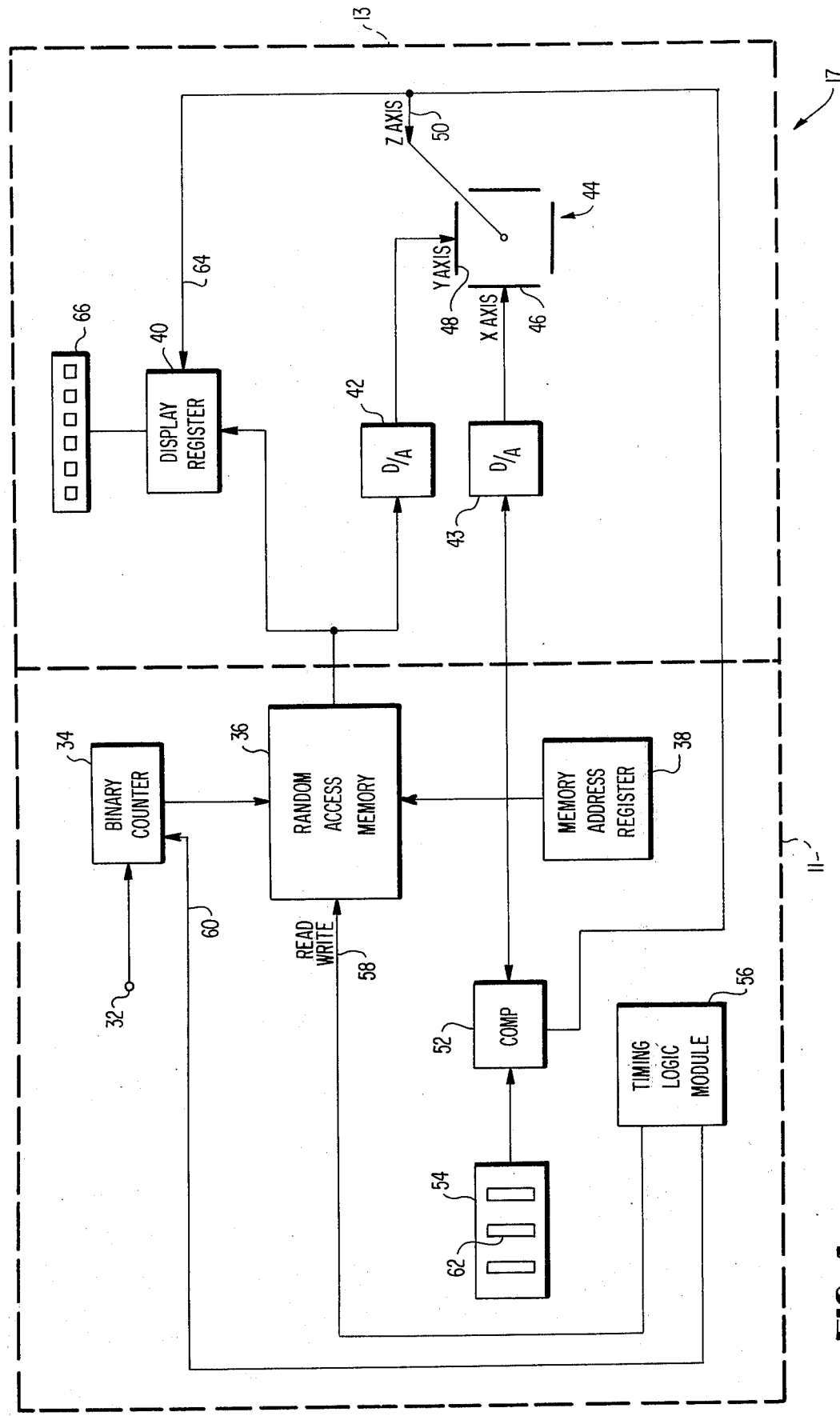
FIG. 4 is a block diagram of the data sampling and storage unit and the visual display unit of the present invention.

As shown in FIG. 4, the sampling storage and display system 17 consists of two sections, a sampling and storage unit 11 and a display unit 13. The sampling and storage unit 11 may consist of a binary counter 34. A random access memory unit 36 is connected to the output terminal of binary counter 34. The random access memory unit has a memory address register 38 associated therewith for controlling the entry and removal of data from the random access memory unit. A timing logic module 56 is connected to the reset terminal 60 of binary counter 34 and to the READ, WRITE function control of the random access memory unit 36.

The display system 13 consists of a cathode ray tube (CRT) 44. The CRT 44 has $x$ and $y$ axis control plates 46, 48 which are connected respectively to digital to analog convertors 43 and 42. The output terminal of random access memory unit 36 is connected to digital to analog convertor 42 and also to a display register 40. Memory address register 38 is connected to digital to analog convertor 43. The display register has an output terminal connected to display unit 66.

A comparator 52 is also connected to the memory address register and to an individual memory location reader 54. The comparator 52 has an output terminal which is connected to control input terminal of display register 40 and to the $z$ axis of CRT 44.

The output 32 of the charge digitizer 10 is connected to a binary counter 34 in the sampling and storage unit 11. The sampling and storage unit 11 along with the display unit 13 forms a sampling storage and display system 17 shown in FIG. 4 which is used to translate the pulse rate information from the charge digitizer 10 to a signal which can be viewed and recorded.

The binary counter 34 is allowed to accumulate pulses for a period of time referred to as a sampling period. This sampling period is selectively variable and is controlled by timing logic module 56. At the end of the sampling period, the pulse count contained within the binary counter 34 is transferred to the random access memory 36 and stored in the first memory location of the random access memory 36. The binary counter 34 is then reset by a signal from a timing logic module 56 and the next sampling period is begun. This sampling process is continued until every memory location in the random access memory 36 has been "written". The random access memory 36 may be a conventional 256 word random access memory. When all of the 256 memory word positions of the random access memory 36 have been "written", the sampling storage and display system 17 switches from the acquisition mode to a display mode.

In the display mode, the memory address register 38 is incremented at a constant 10 kHz rate resulting in a repetitive cycling through the memory. The output of the memory is then representative of the total number of pulses (and since each memory had been "written" with a pulse count accumulated during a selected fixed time period this also represents the average pulse rate) accumulated by the counter during each of the 256 sample periods. This output is displayed by converting the binary numbers in each of the memory locations to analog voltages using a digital to analog converter 42. The output of the digital to analog converter 42 is applied to the vertical deflection plates or $y$ axis 48 of a cathode ray tube (CRT) 44. The horizontal deflection plates or $x$ axis for the CRT 44 is connected to the memory address register 38 through a digital to analog converter 43 which steps the horizontal deflection of the CRT through 256 horizontal positions which correspond to each of the 256 memory locations in the random access memory 36. The analog voltage output of the digital to analog converter 43 results in a maximum beam deflection to the left for memory location 0 and a maximum beam deflection to the right for memory location 255. The net effect is a display which represents the input pulse rate information for each of the sampling periods shown in a proper chronological order.

TO assist in reading individual data points on the CRT display, a set of thumbwheel switches 62 is provided on an individual memory location reader 54 which is connected to the basic sampling storage and display system 17. The thumbwheel switches 62 are used to select an individual memory location desired to be read. The individual memory location reader 54 generates an output corresponding to the desired position which is fed to the comparator 52. The comparator 52 is also connected to memory address register 38. Upon coincidence of the desired position selected by individual memory location reader 54 and the output of the memory access register 38, the comparator 52 generates a control pulse which loads the output of the particular address memory location into display register 40. This output of comparator 52 gates the display register 40 through gating terminal 64. The contents of display register 56 can then be displayed on visual display unit 66.

The output pulse of comparator 52 can also be used to modulate the CRT 44 electron beam intensity. This is done by connecting the output pulse to the $z$ axis 50 of the CRT 44. This results in a brightened spot on the CRT 44 display at the exact memory location selected by the thumbwheel switch 62. Thus, using the thumbwheels 62 and the numerical readout on display unit 66, the exact value of any data points contained within the random access memory 36 can be obtained, thereby eliminating any inaccuracies which may arise from reading waveforms displayed on the face of the CRT 44.

In operation, the entire system of the present invention thus measures simultaneously the instantaneous exposure rate, total exposure, and exposure time. The resulting waveform shown on the CRT 44 or plotted from the values displayed on display unit 66 for each memory location, can give a definite indication of any improper time variation of the radiation exposure of the apparatus being tested thus indicating any improper operation of the tested device. The device also measures the total exposure which can be obtained by adding all of the pulse rate values in each of the memory locations over any desired period of interest and dividing the sum by 6000. Exposure rate, which is also of interest, can be calculated by dividing the exposure per sampling period by the sampling period.

It will be obvious to those skilled in the art that various changes may be made without departing from the scope of the invention, and the invention is not considered limited to the embodiments shown in the drawings and described in the specification beyond the scope of the following claims.

What is claimed is:

1. A charge digitizer comprising:
   an input terminal electrically connected to a source of electrical charge;
   a charge integrating means, electrically connected to said input terminal and having an integrating capacitor, for generating an output voltage representative of the total electrical charge appearing on said input terminal, said integrating means having an output terminal;
   a pulse generating means for generating a series of pulses having uniform pulse width and pulse height and at a constant pulse repetition rate, said pulse generating means having an input terminal and an output terminal;
   comparator means, connected to said output terminal of said integrator means and said input terminal of said pulse generating means, for causing said pulse generator means to generate pulses in response to said output voltage of said integrator means being greater than a preset threshold value;
   charge impulse source means, including an analog switch electrically connected to said output terminal of said pulse generating means and a high megohm resistance connected in series with said analog switch, for feeding said series of pulses to said input terminal of said integrator means, thereby providing a negative feedback to said integratiing means; and
   a digital pulse output terminal electrically connected to said output terminal of said pulse generating means.

2. The charge digitizer as recited in claim 1 wherein said integrating means includes:
   an operational amplifier having an input electrode electrically connected to said input terminal of said integrating means and an output electrode electrically connected to said output terminal of said integrating means; and
   said integrating capacitor is electrically connected between said input electrode and said output electrode.

3. The charge digitizer as recited in claim 1 wherein: said pulse generating means includes first and second non-retriggerable one-shot multivibrators, electrically connected in a feedback configuration.

4. An apparatus for the measurement of time varying radiation fields comprising:
- a radiation detection means for generating an electrical output representative of an amount of radiation to which said detection means is exposed;
- a charge digitizer means, electrically connected to said detection means, for generating a train of pulses representative of said amount of radiation;
- a sampling and storage means for sampling said train of pulses for a plurality of preset periods of time, determining a sample value for each of said plurality of preset periods of time, and storing a predetermined number of said sample values; and visual display means for simultaneously visually displaying said predetermined number of said sample values in proper chronological order.

5. The apparatus as recited in claim 4 wherein said radiation detection means includes an electrometer.

6. The apparatus as recited in claim 4 wherein said charge digitizing means comprises:
- an input terminal electrically connected to said radiation detection means;
- a charge integrating means, electrically connected to said input terminal and having an integrating capacitor, for generating an output voltage representative of the total electrical charge appearing on said input terminal, said integrating means having an output terminal;
- a pulse generating means for generating a series of pulses having uniform pulse width and pulse height and at a constant pulse repetition rate, said pulse generating means having a input terminal and an output terminal;
- comparator means, connected to said output terminal of said integrating means and said input terminal of said pulse generating means, for causing said pulse generator means to generate pulses in response to said output voltage of said integrating means being greater than a preset threshold value;
- charge impulse source means, including an analog switch electrically connected to said output terminal of said pulse generating means and a high megohm resistance connected in series with said analog switch, for feeding said series of pulses to said input terminal of said integrator means, thereby providing a negative feedback to said integrating means; annd
- a digital pulse output terminal electrically connected to said output terminal of said pulse generating means.

7. The apparatus as recited in claim 6, wherein said integrating means includes:
- an operational amplifier having an input electrode electrically connected to said input terminal of said integrating means and an output electrode electrically connected to said output terminal of said integrating means; and
- said integrating capacitor is electrically connected between said input electrode and said output electrode.

8. The apparatus as recited in claim 6 wherein:
- said pulse generating means includes first and second non-retriggerable one-shot multivibrators, electrically connected in a feedback configuration.

9. The apparatus as recited in claim 4 wherein said sampling storage and display means includes;
- a counter means, having an electrical output terminal, for generating a data signal, on said output terminal of said counter, representative of the number of pulses in said train of pulses in a preset period of time;
- a memory storage means, connected to said output terminal of said counter and having a plurality of memory storage locations for sequentially storing said data signal in each of said plurality of memory storage locations after each of said preset periods of time; and
- an output means for feeding the data signal in each of said plurality of memory storage locations to said visual display means.

10. The apparatus as recited in claim 9 further including:
- means for selectively displaying a single data signal from a selected one of said plurality of memory storage locations.

* * * * *